(12) United States Patent
Arvidson et al.

(10) Patent No.: US 10,716,048 B2
(45) Date of Patent: Jul. 14, 2020

(54) DETECTING CRITICAL LINKS IN BLUETOOTH MESH NETWORKS

(71) Applicant: Telefonaktiebolaget LM Ericsson (publ), Stockholm (SE)

(72) Inventors: Pontus Arvidson, Sollentuna (SE); Piergiuseppe di Marco, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 11 days.

(21) Appl. No.: 16/309,569

(22) PCT Filed: Nov. 12, 2018

(86) PCT No.: PCT/EP2018/080916
§ 371 (c)(1),
(2) Date: Dec. 13, 2018

(87) PCT Pub. No.: WO2020/052791
PCT Pub. Date: Mar. 19, 2020

(65) Prior Publication Data
US 2020/0084689 A1 Mar. 12, 2020

Related U.S. Application Data (60) Provisional application No. 62/729,215, filed on Sep. 10, 2018.

(51) Int. Cl.
*H04W 40/24* (2009.01)
*H04W 84/20* (2009.01)
(Continued)

(52) U.S. Cl.
CPC ........... *H04W 40/246* (2013.01); *H04L 45/02* (2013.01); *H04L 45/123* (2013.01);
(Continued)

(58) Field of Classification Search
CPC .......... H04W 40/24–248; H04W 84/18; H04L 45/02; H04L 45/021; H04L 45/123;
(Continued)

(56) References Cited

U.S. PATENT DOCUMENTS 8,619,785 B2     12/2013  Allan et al.
2013/0064139 A1*  3/2013  Kolavennu ............. H04L 45/02
                                                    370/255
(Continued)

OTHER PUBLICATIONS

Perkins, C., et al., "Ad hoc On-Demand Distance Vector (AODV) Routing", Network Working Group; Request for Comments: 3561; Category: Experimental, Jul. 2003, pp. 1-37.
(Continued)

*Primary Examiner* — Pao Sinkantarakorn
(74) *Attorney, Agent, or Firm* — Murphy, Bilak & Homiller, PLLC (57) ABSTRACT

A method for identifying a critical link in a path between a source node and a destination node in a wireless mesh network, wherein said method comprises the steps of receiving, a forwarding path request, PREQ, message relating to a discovery of a path between said source node and said destination node, determining that further PREQ message relating to the discovery of said path are not received during a predetermined duration, and, triggered by said determination, setting a first critical flag in a discovery table entry associated with said path between said source node and said destination node, and forwarding said received PREQ message to one or more other nodes in said wireless mesh network.

21 Claims, 8 Drawing Sheets

(51) Int. Cl.
*H04L 12/721* (2013.01)
*H04W 40/28* (2009.01)
*H04L 12/751* (2013.01)
*H04L 12/725* (2013.01)
*H04W 4/80* (2018.01)

(52) U.S. Cl.
CPC ........... *H04L 45/306* (2013.01); *H04W 40/28* (2013.01); *H04W 84/20* (2013.01); *H04W 4/80* (2018.02)

(58) Field of Classification Search
CPC . H04L 45/127; H04L 45/128; H04L 45/1283; H04L 45/1287; H04L 45/26; H04L 45/28
See application file for complete search history.

(56) References Cited

U.S. PATENT DOCUMENTS

2014/0369359 A1* 12/2014 Kondo ................. H04W 40/28
 370/400
2015/0334629 A1* 11/2015 Patil .................... H04W 40/244
 370/338
2016/0029403 A1* 1/2016 Roy ................. H04W 72/0406
 370/336

OTHER PUBLICATIONS

Perkins, Charles E., "Ad-hoc On-Demand Distance Vector Routing", Proceedings WMCSA, 2nd IEEE Worskhop on Mobile Computing Systems and Applications, Doc. No. XP-002173721, Feb. 25, 1999, pp. 1-11.

* cited by examiner

DETECTING CRITICAL LINKS IN BLUETOOTH MESH NETWORKS

TECHNICAL FIELD OF THE DISCLOSURE

The present invention generally relates to wireless communication networks, and more specifically relates to improvements to forwarding of data messages in mesh networks, such as Bluetooth mesh networks.

BACKGROUND INFORMATION

Bluetooth™ refers generally to a standardized group of technologies usable to exchange data between devices over short distances using radio transmission and reception in the 2.4-GHz ISM band. The promulgation and management of Bluetooth standards is done by various committees of the Bluetooth SIG, of which over 30,000 companies are members.

Bluetooth Low Energy (LE) is a particular version of Bluetooth technology that was first standardized by the Bluetooth SIG in 2010. Bluetooth LE is generally targeted at low-power applications that can tolerate lower-rate communications than, e.g., more traditional Bluetooth applications. Furthermore, Bluetooth LE is suitable for inexpensive devices that are constrained in terms of memory and computational resources.

Even so, Bluetooth LE leverages a robust frequency-hopping spread spectrum approach that transmits data over 40 channels. Furthermore, a Bluetooth LE-compliant radio includes multiple physical layer (PHY) options that support data rates from 125 kb/s to 2 Mb/s, multiple power levels, from 1 mW to 100 mW, as well as multiple security options.

Bluetooth LE also supports multiple network topologies, including a conventional point-to-point topology used for establishing one-to-one (1:1) communications between two devices. In addition, Bluetooth LE supports a broadcast (one-to-many, or 1:m) device communications. The broadcast topology can be used for localized information sharing and for location services such as retail point-of-interest information, indoor navigation and wayfinding, and item/asset tracking.

Finally, Bluetooth LE supports a mesh topology that can be used for establishing many-to-many (m:m) device communications. The mesh topology based on Bluetooth LE can enable the creation of large-scale device networks such as for control, monitoring, and automation systems where tens, hundreds, or thousands of devices need to reliably and securely communicate with each other. In the Bluetooth LE mesh topology, each device in a mesh network potentially can communicate with every other device in the mesh network. Communication is achieved using messages, and devices can relay messages to other devices so that the end-to-end communication range is extended far beyond the radio range of each individual device.

Devices that are part of a Bluetooth LE mesh network are referred to as "nodes" whereas other devices not part of the mesh (e.g., even though within range of the mesh) are referred to as "unprovisioned devices." The process which transforms an unprovisioned device into a node is called provisioning. This is a secure procedure which results in an unprovisioned device possessing a series of encryption keys and being known to the Provisioner device, such as a tablet or smartphone. A Provisioner is a device responsible for adding a node to a network and configuring its behavior.

As mentioned above, communication in a Bluetooth mesh network is "message-oriented" and various message types are defined. For example, when a node needs to query the status of other nodes or needs to control other nodes in some way, it can send a message of a suitable type. If a node needs to report its status to other nodes, it can send a message of suitable type. Messages must be sent from an address and to an address. Bluetooth mesh topology supports three different types of addresses. A unicast address uniquely identifies a single element (e.g., devices can include one or more elements), and unicast addresses are assigned to devices during the provisioning process. A group address is a multicast address which represents one or more elements. A virtual address may be assigned to one or more elements, spanning one or more nodes.

Figure 1:
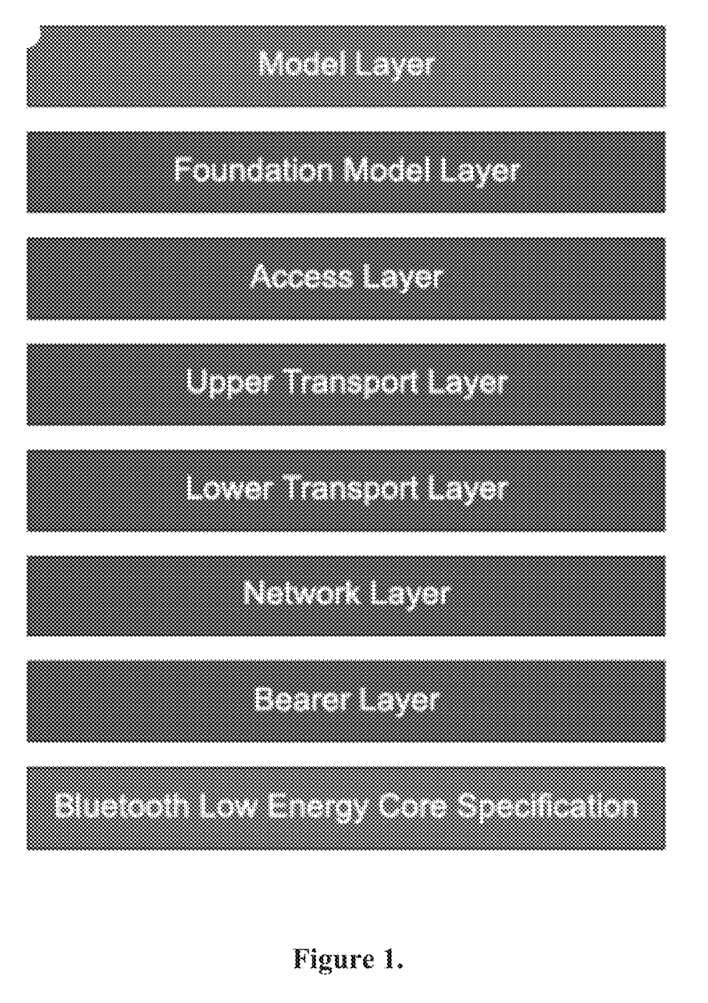
FIG. 1 shows an exemplary layered mesh architecture based on Bluetooth LE, as specified by the Bluetooth SIG.

To further facilitate the use of Bluetooth LE in mesh network topologies, the Bluetooth SIG promulgated the Mesh Profile Specification in July 2017. FIG. 1 shows an exemplary layered mesh architecture based on Bluetooth LE, as specified by the Bluetooth SIG. At the top is the Model layer, which defines models used to standardize the operation of typical user scenarios, such as models for lighting and sensors. The Model layer is further defined in other Bluetooth specifications, including a Bluetooth Mesh Model specification. The Foundation Model layer defines the states, messages, and models required to configure and manage a mesh network. The Access layer defines how higher-layer applications can use the upper transport layer. It defines the format of the application data; it defines and controls the application data encryption and decryption performed in the upper transport layer; and it checks whether the incoming application data has been received in the context of the right network and application keys before forwarding it to the higher layer.

The Transport layer is subdivided into the Upper and Lower Transport Layers. The Upper Transport Layer encrypts, decrypts, and authenticates application data and is designed to provide confidentiality of access messages. It also defines how transport control messages are used to manage the upper transport layer between nodes, including when used by the "Friend" feature. The Lower Transport Layer defines how upper transport layer messages are segmented and reassembled into multiple Lower Transport protocol data units (PDUs) to deliver large upper transport layer messages to other nodes. It also defines a single control message to manage segmentation and reassembly.

The Network Layer defines how transport messages are addressed towards one or more elements. It defines the network message format that allows Transport PDUs to be transported by the bearer layer. The network layer decides whether to relay/forward messages, accept them for further processing, or reject them. It also defines how a network message is encrypted and authenticated. The bearer layer defines how network messages are transported between nodes. There are two bearers defined, the advertising bearer and the GATT bearer.

Figure 2:
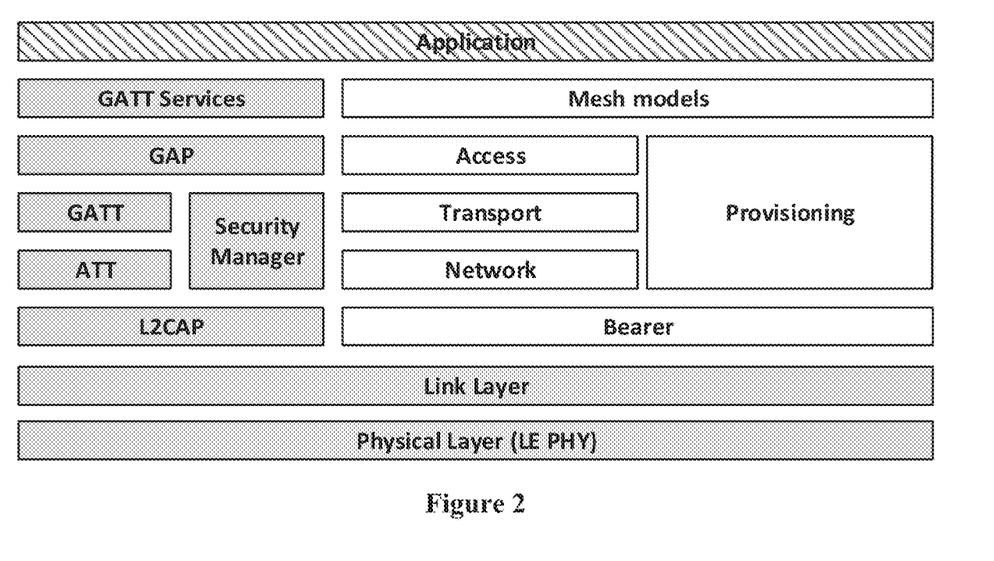
FIG. 2 further illustrates how Bluetooth mesh networking integrates with the Bluetooth LE architecture shown in FIG. 1.

At the bottom of the exemplary architecture shown in FIG. 1 are the Bluetooth LE radio layers. FIG. 2 further illustrates how Bluetooth mesh networking integrates with Bluetooth LE architecture shown in FIG. 1. In FIG. 2, shading is used to indicate blocks or layers that are part of the Bluetooth LE specification. At the bottom are the Bluetooth LE physical (PHY) and link layers, which typically can be implemented in the Bluetooth controller. The layers above link layer typically can be implemented on the Bluetooth host device. On the left side of FIG. 2 are Bluetooth LE higher layers that can be utilized independent of mesh networking functionality. The non-shaded blocks on the right side above the link layer correspond to the mesh networking architecture shown in FIG. 1 (plus provisioning). In this manner, applications (shown at the top-most layer in FIG. 2) can utilize both mesh and non-mesh functionality of the underlying Bluetooth LE technology.

Currently, Bluetooth mesh networking is based on "flooding" which uses broadcasting over a set of shared channels—the advertising channels. A node acting as a relay node in a Bluetooth mesh network scans for mesh messages. When a message is detected and received the node checks if it is the destination of the message. The message can be forwarded in the mesh network by re-transmitting it so that the neighbors of the node can receive it. By means of this distributed mechanism the message is forwarded from node to node(s) in the network so that the message arrives at the destination.

Flooding, as specified in version 1.0 of the Bluetooth mesh specification, has some drawbacks including increased interference and energy consumption, especially as the level of traffic in the network increases. As such, subsequent versions of the Bluetooth mesh specifications are expected to implement mechanisms to limit packet forwarding to occur only along specific paths towards the intended receiver(s). This is expected to reduce the amount of traffic (and consequently alleviate the exemplary drawbacks mention) in directions where forwarding does not help improving the probability of successful delivery.

One known technique to construct forwarding paths between a source and one or more destinations is through path discovery according to an "ad hoc on-demand distance vector (AODV)," such as specified in RFC 3561 published by Internet Engineering Task Force (IETF). AODV can determine unicast routes to destinations within an ad hoc network with quick adaptation to dynamic link conditions, while requiring relatively low processing and memory overhead and low network utilization. In addition, AODV uses destination sequence numbers to facilitate freedom from loops, even after anomalous delivery of routing control messages.

More specifically, AODV methods establish paths by means of Path Request (also referred to as "Route Request") messages flooded by the originator and Path Reply (also referred to as "Route Reply") messages unicasted back by the destination. Intermediate relays that receive the Path Reply message store path information in a forwarding table and are entitled to forward packets. Sequence numbers (also referred to as "forwarding numbers") increase with each new Path Request message and, as such, can be used to distinguish new Path Request messages from copies of Path Request messages already forwarded in the network.

A particular feature of Bluetooth Mesh is that data messages do not contain explicit next-hop indications. As mentioned above, a path is identified by a combination of the addresses of the originator of the path and the address of the destination of the path. As such, multiple nodes that receive a message and belong to the path can forward the message. This provides opportunities to enable robust, multi-path communication via completely independent redundant paths that can be traversed without having to replicate messages to each of the next-hop destinations. In addition, these characteristics facilitate the introduction of assistant relay nodes for local path repair.

Even so, the network topology and propagation conditions in a wireless (e.g., Bluetooth) mesh network deployment can limit the availability of these redundancy mechanisms. For example, when a given link is present in more than one (e.g., potentially all) possible communication paths between a source node and a destination node, it is referred to as a "critical link." Losses of such critical links impact the end-to-end reliability of the mesh network, particularly the forwarding mechanism in Bluetooth mesh.

SUMMARY

Embodiments of the present disclosure provide specific improvements to communication between nodes in a wireless mesh network, such as by providing novel techniques for detecting the presence of critical links and providing the signaling flow necessary to enable additional redundancy mechanisms for a wireless (e.g., Bluetooth) mesh network. In this manner, embodiments can improve overall reliability of wireless (e.g., Bluetooth) mesh networks. Furthermore, such exemplary embodiments can be fully compatible with existing path discovery mechanisms for Bluetooth mesh networks, such that a node utilizing these novel techniques can co-exist and/or interoperate with other legacy nodes, in the same Bluetooth mesh network, that do not implement such techniques.

Some exemplary embodiments of the present disclosure include methods and/or procedures for forwarding path request (PREQ) messages related to the discovery of a path between a source node and a destination node in a wireless mesh network. The exemplary method and/or procedure can be performed by an intermediate node (e.g., user equipment, wireless device, IoT device, Bluetooth Low-Energy device, etc. or component thereof) in the wireless mesh network (e.g., a Bluetooth mesh network).

The exemplary methods and/or procedures can include receiving a first PREQ message relating to the discovery of a path between the source node and the destination node. The exemplary methods and/or procedures can also include determining whether further PREQ messages relating to the discovery of the path were received during a predetermined duration after receiving the first PREQ message. The exemplary methods and/or procedures can also include, if it is determined that further PREQ messages relating to the discovery of the path were not received during the predetermined duration, setting a first critical flag in a discovery table entry associated with the path between the source node and the destination node.

In some embodiments, the first critical flag in the discovery table can indicate that the intermediate node can be part of a critical link in the path. In some embodiments, the setting of the first critical flag can be further based upon one of the following conditions: 1) determining that a forwarding table, stored in the intermediate node, includes an entry corresponding to a path between the source node and the destination node, and that the entry includes a second critical flag having a value indicating that the intermediate node is part of a critical link in the path; or 2) determining that the forwarding table does not include an entry corresponding to a path between the source node and the destination node.

The exemplary methods and/or procedures can also include forwarding the PREQ message to one or more other nodes in the wireless mesh network. In some embodiments, the exemplary method and/or procedure can also include, prior to forwarding the PREQ message, setting the value of a flag comprising the PREQ message to indicate that the forwarding table does not include an entry corresponding to a path between the source node and the destination node. In some embodiments, the exemplary method and/or procedure can also include, if it is determined that further PREQ messages relating to the discovery of the path were received during the predetermined duration, forwarding the PREQ message to one or more other nodes in the wireless mesh network without setting the first critical flag.

Other exemplary embodiments of the present disclosure include methods and/or procedures for forwarding path reply (PREP) messages related to the discovery of a path between a source node and a destination node in a wireless mesh network. The exemplary method and/or procedure can be performed by an intermediate node (e.g., user equipment, wireless device, IoT device, Bluetooth Low-Energy device, etc. or component thereof) in the wireless mesh network (e.g., a Bluetooth mesh network).

These exemplary methods and/or procedures can include receiving a first PREP message relating to the discovery of a path between the source node and the destination node. In some embodiments, the exemplary methods and/or procedures can also include, in response to receiving the first PREP message, creating an entry, associated with the path, in a forwarding table stored in the intermediate node.

The exemplary methods and/procedures can also include determining whether an entry in a discovery table, stored in the intermediate node, includes a first critical flag having a value indicating that the intermediate node is part of a critical link in the path. The exemplary methods and/procedures can also include, if it is determined that the first critical flag has a value indicating that the intermediate node is part of a critical link in the path, setting a second critical flag in the first PREP message before forwarding the first PREQ message to one or more other nodes in the wireless mesh network. In some embodiments, if it is determined that the first critical flag has a value indicating that the intermediate node is not part of a critical link in the path, the exemplary methods and/or procedures can include forwarding the first PREQ message to one or more other nodes in the wireless mesh network without setting the second critical flag.

In some embodiments, the exemplary methods and/or procedures can also include, if it is determined that the first critical flag has a value indicating that the intermediate node is part of a critical link in the path, setting a destination critical flag in an entry, associated with the path, of a forwarding table stored in the intermediate node. In some embodiments, the exemplary methods and/or procedures can also include, if it is determined that the second critical flag has a value indicating that the intermediate node is part of a critical link in the path, increasing the number of retransmissions for network-layer protocol data units (PDUs) over the critical link.

In some embodiments, each of the path requests comprises an Ad hoc On-Demand Distance Vector (AODV) Route Request (RREQ) message, and the path reply comprises an AODV Route Reply (RREP) message. In some embodiments, the wireless mesh network is a Bluetooth mesh network, and the exemplary method and/or procedure is performed by a Bluetooth Low-Energy node.

Other exemplary embodiments include node (e.g., user equipment, wireless device, IoT device, Bluetooth Low-Energy device, etc. or component thereof) configured to perform operations corresponding to various ones of the exemplary methods and/or procedures described above. Other exemplary embodiments include non-transitory, computer-readable media storing program instructions that, when executed by at least one processor, configure such nodes to perform operations corresponding to the exemplary methods and/or procedures described above.

These and other objects, features and advantages of the exemplary embodiments of the present disclosure will become apparent upon reading the following detailed description of the exemplary embodiments of the present disclosure.

DETAILED DESCRIPTION

Figure 3:
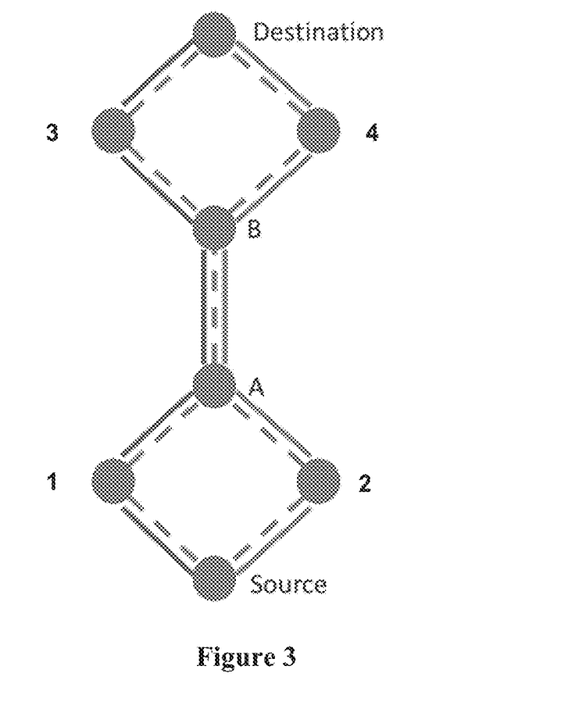
FIG. 3 shows an exemplary mesh network comprising a source node, a destination node, and six intermediate (relay) nodes.

As briefly mentioned above, the existence of critical links between source and destination nodes limit the capability of available redundancy mechanisms in Bluetooth mesh networking. FIG. 3 shows an exemplary mesh network comprising a source node, a destination node, and six intermediate (or relay) nodes. As illustrated in FIG. 3, the relay nodes are labelled 1-4 and A-B. As further illustrated by the solid lines in FIG. 3, there are two paths between the source and destinations nodes, one traversing relay nodes {1, A, B, 3} and the other traversing relay nodes {2, A, B, 4}. The dashed lines illustrated the propagation of path request messages throughout the mesh network. Since link A-B is part of both paths, it is a critical link, such that the two paths are not independent. FIG. 3 is representative of a scenario where source and destination nodes are located in different areas of a building, interconnected by corridors.

In the event that critical link A-B was no longer available, a path is no longer available between the source and destination nodes. Furthermore, the use of assistant relay nodes for local path repair requires the existence of an intermediate node that is neighbor of both A and B, which does not exist in the topology shown in FIG. 3. In fact, there currently exists no mechanism defined in Bluetooth mesh to detect (and react to) the presence of a critical link such as A-B shown in FIG. 3.

Accordingly, exemplary embodiments of the present disclosure provide novel techniques for detecting the presence of critical links and providing the signaling flow necessary to enable additional redundancy mechanisms for a wireless (e.g., Bluetooth) mesh network. For example, critical links can be identified by determining, at an intermediate node, how many neighbors are forwarding messages from a source node to a destination node though that intermediate node. When only one neighbor node is detected, the mesh network can enable additional reliability mechanisms (e.g., increasing the number of retransmissions towards the source) and can notify the single neighbor node so that it can also use the same additional reliability mechanism for messages towards the destination. Furthermore, the detection of a single forwarding neighbor node can also trigger redundant path discovery mechanisms.

In this manner, exemplary embodiments improve overall reliability of wireless (e.g., Bluetooth) mesh networks. Furthermore, such exemplary embodiments are fully compatible with existing path discovery mechanisms for Bluetooth mesh technology, such that a node utilizing these novel techniques can co-exist and/or interoperate with other legacy nodes, in the same Bluetooth mesh network, that do not implement such techniques. For example, when an intermediate node detects a critical link with a neighbor node, the remedy involves signaling messages only between those two nodes of the critical link.

Certain exemplary embodiments include enhancements and/or supplemental techniques used with existing path discovery mechanisms such as AODV, as explained further below in the context of the exemplary mesh network shown in FIG. 3. More specifically, the source node in FIG. 3 can establish a first path to the destination node by sending a path request message with a newly generated forwarding or sequence number. This can occur, for example, if the destination node is previously unknown to the source node. Recall that the dashed lines in FIG. 3 illustrate the propagation of path request messages throughout the mesh network.

Figure 4:
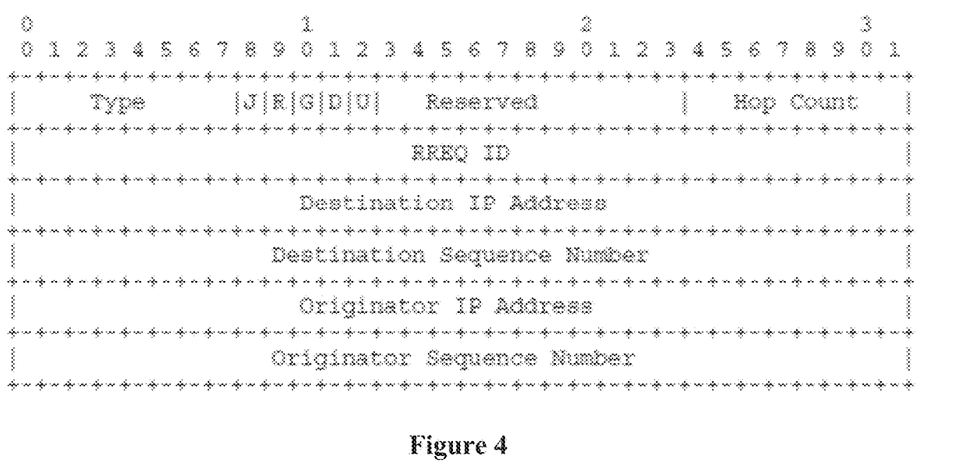
FIG. 4 illustrates the format of an exemplary a path request (PREQ) message.

FIG. 4 illustrates the format of an exemplary a path request message. In particular, the exemplary format shown in FIG. 4 corresponds to a Route Request (RREQ) message used in the AODV routing protocol specified in RFC 3561. In this format, the source node generates a new sequence number and inserts it into the Originator Sequence Number (OSN) field of the path request message, filling other message fields as needed with relevant values. The top-most 32-bit word in the format shown in FIG. 4 includes a "hop count" field and a "reserved" field.

The first path request is received by the destination node after being forwarded by one or more intermediate nodes, with each forwarding node incrementing the "hop count" value. Thus, when the path request reaches the destination node, the "hop count" represents the distance (in "hops") between the source and destination nodes. Furthermore, due to the mesh topology, the destination node can receive multiple version of the same path request, each version having traversed a different path of intermediate nodes. Subsequently, the first path is established by the destination node transmitting a path reply back to the originator via the best path, which can be selected by the destination node in various ways. For example, the destination node can select the best path based on which of the received path requests includes the lowest "hop count" value.

Figure 5:
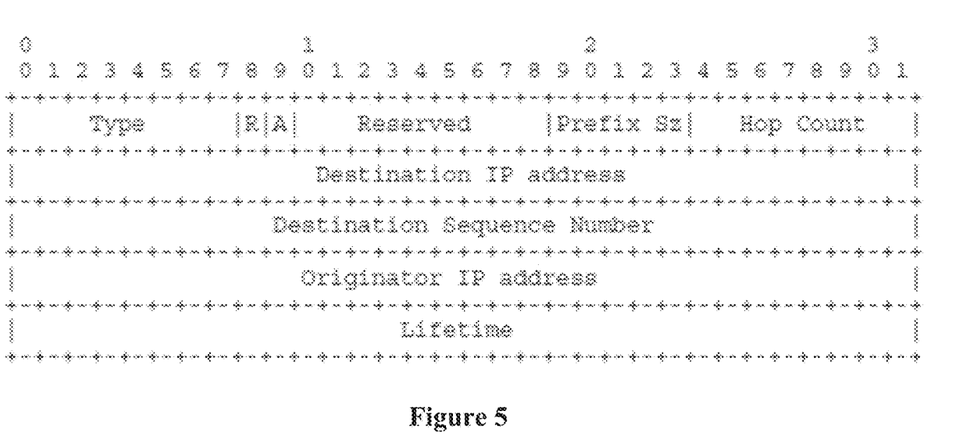
FIG. 5 illustrates the format of an exemplary a path reply (PREP) message.

When intermediate nodes in the "best path" receive this path reply, they store the corresponding path information, including the forwarding or sequence number, in their respective forwarding tables. FIG. 5 illustrates the format of an exemplary a path reply message. In particular, the format shown in FIG. 5 corresponds to a Route Reply (RREP) message used in the AODV routing protocol specified in RFC 3561. In the format shown in FIG. 5, the "destination sequence number" can correspond to the sequence number of the path request message, such that intermediate nodes receiving the path reply can correlate it with the earlier-received path request. Note that the top-most 32-bit word in the format shown in FIG. 5 also includes a "hop count" field and a "reserved" field. Like the path request message discussed above, intermediate nodes along the "best path" increment the "hop count" value when forwarding the path reply message. Ultimately, the source node receives this path reply and stores the information about the first path to the destination node in its routing table. For example, the first path can be established via relay nodes {1, A, B, 3}.

According to certain exemplary embodiments, however, prior to forwarding a received path request message, intermediate nodes can count the number of distinct received path request messages associated with a particular path discovery (e.g., involving a particular source node and a particular destination node) before forwarding the path request message. If only a single path request message is detected, then the intermediate node is potentially part of a critical link for the path. For example, in the context of Bluetooth mesh networks, distinct path request messages for the same path discovery can be identified by the presence of the same Path Originator (PO) and Originator Sequence Number (OSN) fields, but a different address in the (SRC) field of the Network PDU of the path request message.

Subsequently, upon receiving a path reply message associated with the path request message, the node can identify itself as part of the critical link and can notify the neighbor intermediate node (i.e., the node from which the single path request message was received) that it is also part of the critical link in the path. This can be done, e.g., by setting a flag in the path reply message that is forwarded to the neighbor node.

Related U.S. Provisional Application 62/719,247, incorporated herein by reference, discloses exemplary techniques for establishing redundant paths between a source node and a destination node in a wireless mesh network. In these previously-disclosed techniques, a node that has a forwarding table entry for a source-destination pair does not take part in subsequent path discovery procedures for that path. Exemplary embodiments of the present disclosure can be used in conjunction with the previously-disclosed techniques enables a node that is part of a critical link to participate in a subsequent discovery associated to the same source-destination pair, independently of the presence of a forwarding table entry.

Figure 6:
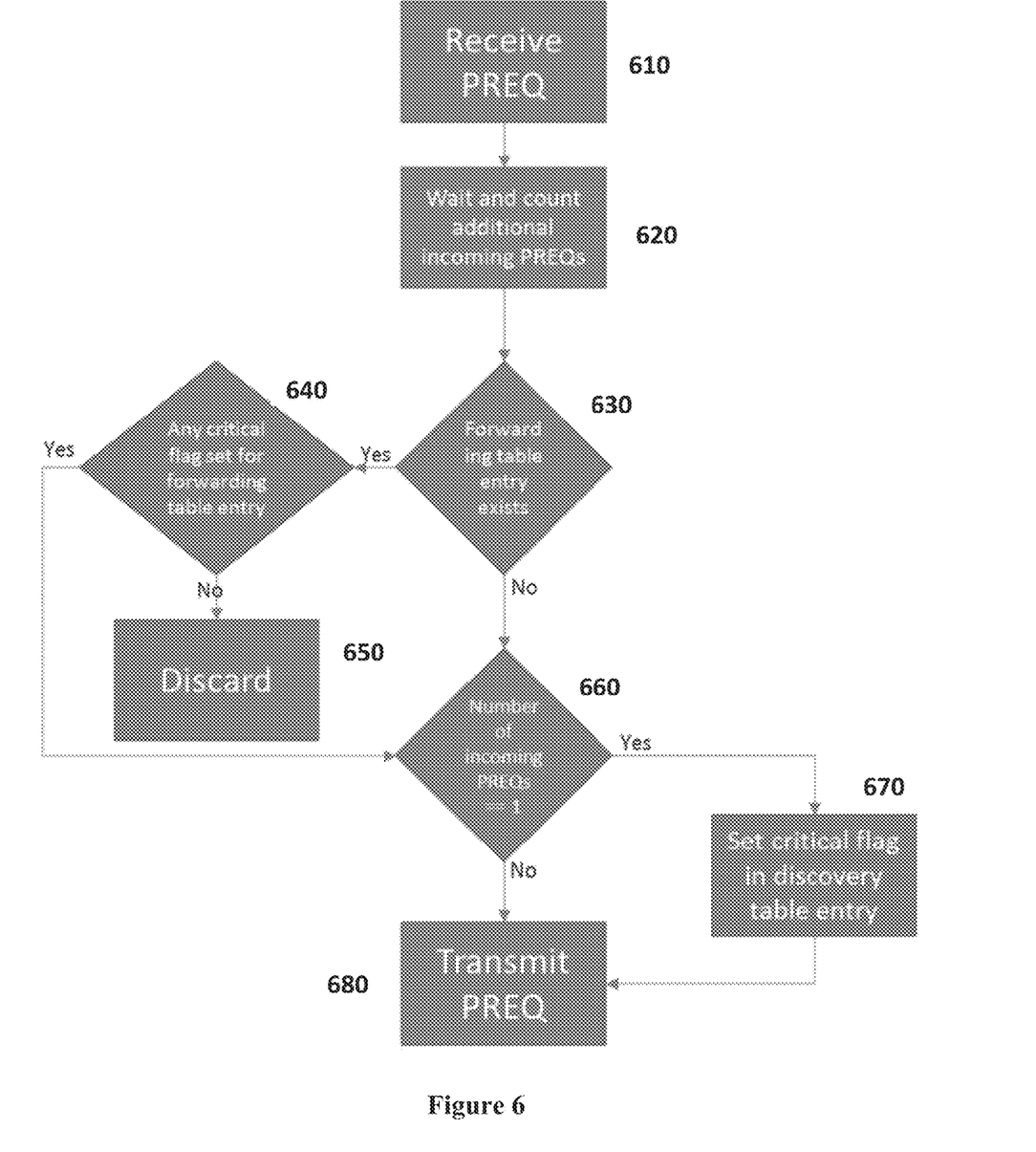
FIG. 6 shows a flow diagram illustrating an exemplary method and/or procedure performed by an intermediate (e.g., relay) node that receives a path request (PREQ) message, according to exemplary embodiments of the present disclosure.

FIG. 6 shows a flow diagram illustrating an exemplary method and/or procedure performed by an intermediate (e.g., relay) node that receives a path request (PREQ) message, according to exemplary embodiments of the present disclosure. The exemplary method and/or procedure can be performed by an intermediate node (e.g., user equipment, wireless device, IoT device, Bluetooth Low-Energy device, etc. or component thereof) in the wireless mesh network (e.g., a Bluetooth mesh network). For example, the exemplary method and/or procedure shown in FIG. 6 can be implemented, for example, in a node configured according to FIG. 10 (described below). Furthermore, the exemplary method and/or procedure shown in FIG. 6 can be utilized cooperatively with the exemplary method and/or procedures shown in other figures (including but not limited to FIG. 7) to provide various exemplary benefits described herein. In addition, although FIG. 6 shows blocks in a particular order, this order is merely exemplary, and the operations of the exemplary method and/or procedure can be performed in a different order than shown in FIG. 6 and can be combined and/or divided into blocks having different functionality.

Exemplary embodiments of the method and/or procedure illustrated in FIG. 6 can include the operations of block 610, where the node can receive a PREQ message associated with a path discovery between a particular source-destination node pair. In block 620, the node can determine, over a predetermined duration, whether any additional (e.g., distinct) PREQ messages associated with that particular node pair are received. For example, the node can count the received distinct PREQ message(s) associated with the node pair over the predetermined duration. After completion of the predetermined duration, operation proceeds to block 630, in which the node determines if a forwarding table entry associated with that node pair exists. If case of an affirmative determination ("Yes"), operation proceeds to block 640, in which the node determines if a critical flag is set with respect to that forwarding table entry. If this determination is negative ("No"), the received PREQ message(s) associated with the node pair are discarded (block 650).

On the other hand, in case the determination in block 630 is negative ("No") or the determination in block 640 is affirmative ("Yes"), operation proceeds to block 660, where the node can determine if the number of PREQ message(s) associated with the node pair that were received over the predetermined duration (e.g., in block 620) is equal to one. If the determination is negative ("No"), operation proceeds to block 680, where the node forwards the received PREQ messages according to normal flooding operation. On the other hand, if the determination is affirmative ("Yes"), operation first proceeds through block 670, where the node can set a critical flag in the discovery table entry before forwarding the received PREQ messages.

Figure 7:
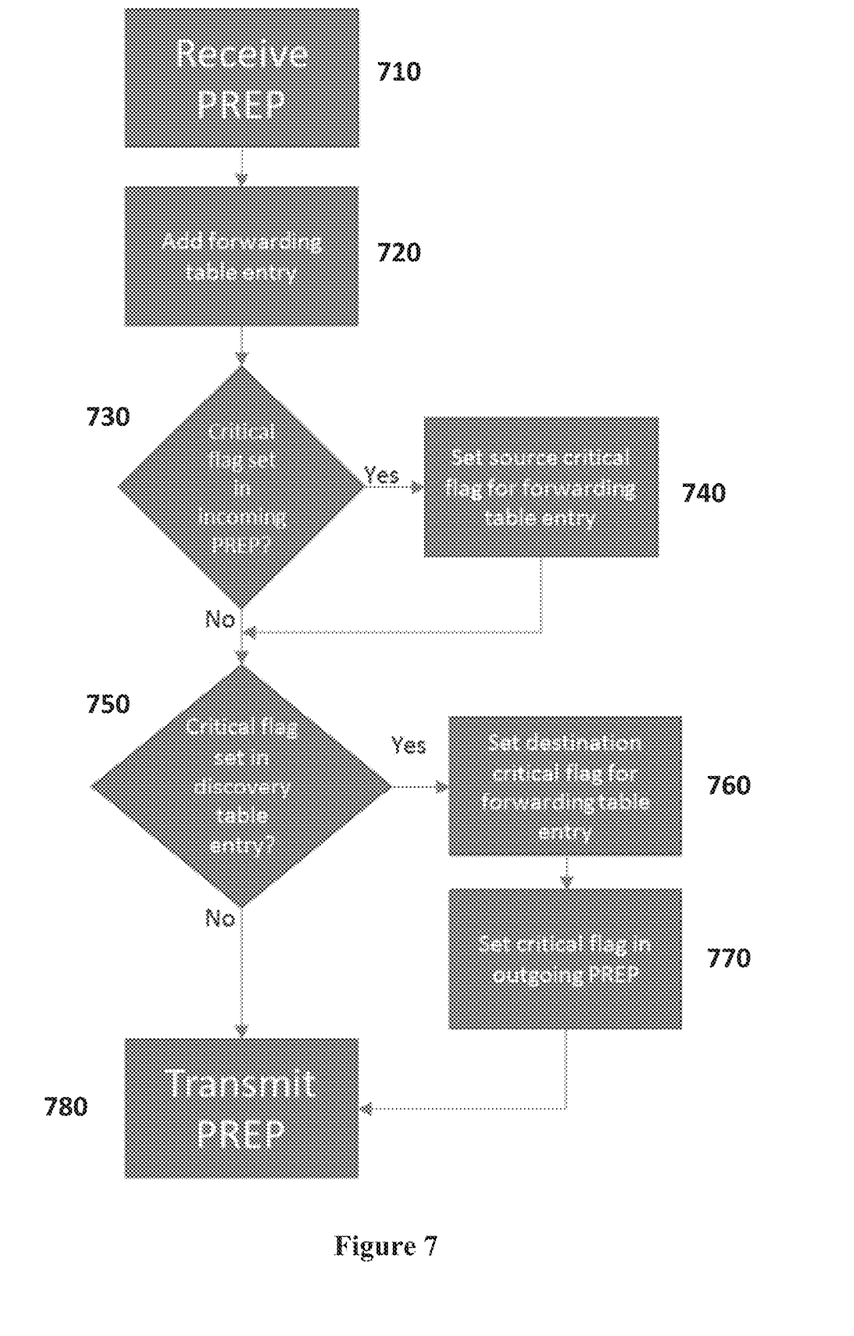
FIG. 7 shows a flow diagram illustrating an exemplary method and/or procedure performed by an intermediate (e.g., relay) node that receives a path reply (PREP) message, according to exemplary embodiments of the present disclosure.

FIG. 7 shows a flow diagram illustrating an exemplary method and/or procedure performed by an intermediate (e.g., relay) node that receives a path reply (PREP) message, according to exemplary embodiments of the present disclosure. The exemplary method and/or procedure can be performed by an intermediate node (e.g., user equipment, wireless device, IoT device, Bluetooth Low-Energy device, etc. or component thereof) in the wireless mesh network (e.g., a Bluetooth mesh network). For example, the exemplary method and/or procedure shown in FIG. 7 can be implemented, for example, in a node configured according to FIG. 10 (described below). Furthermore, the exemplary method and/or procedure shown in FIG. 7 can be utilized cooperatively with the exemplary method and/or procedures shown in other figures (including but not limited to FIG. 6) to provide various exemplary benefits described herein. In addition, although FIG. 7 shows blocks in a particular order, this order is merely exemplary, and the operations of the exemplary method and/or procedure can be performed in a different order than shown in FIG. 7 and can be combined and/or divided into blocks having different functionality.

Exemplary embodiments of the method and/or procedure illustrated in FIG. 7 can include the operations of block 710, where the node can receive a PREP message associated with a path discovery between a particular source-destination node pair. In block 720, the node adds to its forwarding table an entry associated with the particular node pair. In block 730, the node can determine whether a critical flag is set in the received PREP message. If the determination is negative ("No"), operation proceeds directly to block 750. On the other hand, if the determination is affirmative ("Yes"), operation first proceeds to block 740, in which the node can set the source critical flag in the forwarding table entry added in block 720.

In block 750, the node can determine whether the critical flag is set in a discovery table entry associated with the particular source-destination node pair. For example, the node can determine whether the critical flag was previously set in that discovery table entry. If the determination is negative ("No"), operation proceeds to block 780 in which the node can forward the received PREP message to the neighbor node that is identified in the discovery table entry. On the other hand, if the determination is affirmative ("Yes"), the operations of blocks 760-770 are performed before the operations of block 780. More specifically, in block 760, the node can set the destination critical flag in the forwarding table entry added in block 720, and in block 770, the node can set the critical flag in the PREP message forwarded in block 780.

The operation of the exemplary methods and/or procedures described above can be further illustrated in the context of FIG. 3, based on the assumption that both intermediate nodes A and B implement such methods and/or procedures. In such case, node A receives multiple PREQ messages associated with a source-destination node pair and propagates its PREQ message according to the existing discovery mechanisms. However, node B receives only one PREQ message from A during the predetermined duration, indicating that the link between A and B is critical (e.g., the only path from the source node to node B goes through node A). In response, node B sets the critical flag in its discovery table entry associated with that path, and propagates the PREQ message The destination node selects the best among the candidate paths and transmits a PREP message. When the PREP message is received by node B, it checks the critical flag in the discovery table entry and sets the destination critical flag accordingly in the Forwarding Table entry and the critical flag in the outgoing PREP message. When node A receives the PREP message with the critical flag set, it can set the source critical flag in the Forwarding Table entry and propagate the path reply according to existing discovery mechanisms in the mesh network. If the destination node later tries to set up an additional path (using, e.g., the redundant path mechanisms disclosed in the related application), nodes A and B will thus participate in the path discovery procedure because their link is marked as critical, despite already being part of enabling additional nodes to still be added to the path.

In some exemplary embodiments, based on a determination that a node is part of a critical link (e.g., using techniques illustrated by FIGS. 6 and/or 7), the node can configure a mechanism to increase the reliability for that critical link. For example, the node can increase the number of retransmissions for network-layer protocol data units (PDUs) over a source-destination path that includes the critical link. In other words, if the same link is part of multiple paths between a source node and a destination node, the intermediate nodes on either end of the link can increase the redundancy in information sent on each of the multiple paths.

In some exemplary embodiments, a node can include an additional flag (referred to as "unique flag") in PREQ messages prior to forwarding. For example, the node can insert a "1" in the "unique flag" to indicate that the node does not have a corresponding forwarding table entry. If the node does have a corresponding forwarding table entry, it can leave the "unique flag" unchanged prior to forwarding. Subsequent intermediate nodes can manipulate (or not) the "unique flag" in a similar manner. As such, a destination node that receives such PREQs can determine whether redundant paths to a source node can be established based on the values in the respective "unique flags" (e.g., at least one PREQ having "unique flag" set to "1").

In some exemplary embodiments, based on a determination that a node is part of a critical link (e.g., using techniques illustrated by FIGS. 6 and/or 7), and upon detecting that the critical link is unreliable (e.g., inadequate received signal strength, excess interference, etc.), the node can directly issue a path error message instead of initiating a path assistance operation. In other words, based on the link criticality determination, the node assumes that no candidates exist and therefore does not waste time or radio resources on setting up an assisting node.

Figure 8:
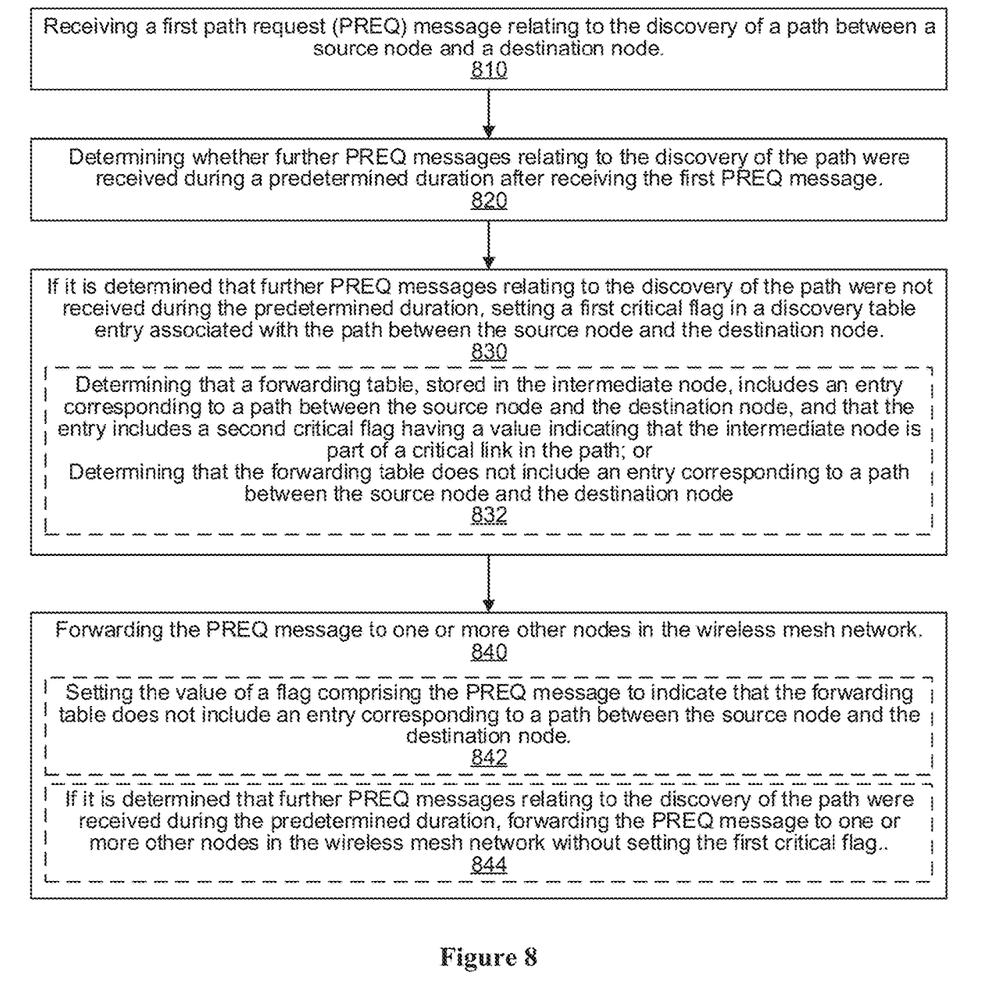
FIG. 8 shows a flow diagram of an exemplary method and/or procedure for forwarding path request (PREQ) messages related to the discovery of a path between a source node and a destination node in a wireless mesh network, according to one or more exemplary embodiments of the present disclosure.

FIG. 8 shows a flow diagram of an exemplary method and/or procedure for forwarding path request (PREQ) messages related to the discovery of a path between a source node and a destination node in a wireless mesh network. The exemplary method and/or procedure can be performed by an intermediate (e.g., relay) node (e.g., user equipment, wireless device, IoT device, Bluetooth Low-Energy device, etc. or component thereof) in the wireless mesh network (e.g., a Bluetooth mesh network). For example, the exemplary method and/or procedure shown in FIG. 8 can be implemented, for example, in a node configured according to FIG. 10 (described below). Furthermore, the exemplary method and/or procedure shown in FIG. 8 can be utilized cooperatively with the exemplary method and/or procedures shown in other figures (including but not limited to FIG. 9) to provide various exemplary benefits described herein. In addition, although FIG. 8 shows blocks in a particular order, this order is merely exemplary, and the operations of the exemplary method and/or procedure can be performed in a different order than shown in FIG. 8 and can be combined and/or divided into blocks having different functionality. Optional blocks or operations are shown by dashed lines.

Exemplary embodiments of the method and/or procedure illustrated in FIG. 8 can include the operations of block 810, where the intermediate node can receive a first PREQ message relating to the discovery of a path between the source node and the destination node. The exemplary method and/or procedure can also include operations of block 820, where the intermediate node can determine whether further PREQ messages relating to the discovery of the path were received during a predetermined duration after receiving the first PREQ message.

The exemplary method and/or procedure can also include operations of block 830, where if it is determined that further PREQ messages relating to the discovery of the path were not received during the predetermined duration, the intermediate node can set a first critical flag in a discovery table entry associated with the path between the source node and the destination node. In some embodiments, the first critical flag in the discovery table can indicate that the intermediate node can be part of a critical link in the path. In some embodiments, the intermediate node can further base the setting of the first critical flag upon one of the following conditions (block 832): 1) determining that a forwarding table, stored in the intermediate node, includes an entry corresponding to a path between the source node and the destination node, and that the entry includes a second critical flag having a value indicating that the intermediate node is part of a critical link in the path; or 2) determining that the forwarding table does not include an entry corresponding to a path between the source node and the destination node.

The exemplary method and/or procedure can also include operations of block 840, in which the intermediate node can forward the PREQ message to one or more other nodes in the wireless mesh network. In some embodiments, the exemplary method and/or procedure can also include operations of block 842, in which the intermediate node can, prior to forwarding the PREQ message, set the value of a flag comprising the PREQ message to indicate that the forwarding table does not include an entry corresponding to a path between the source node and the destination node. In some embodiments, the exemplary method and/or procedure can also include operations of block 844, where if it is determined that further PREQ messages relating to the discovery of the path were received during the predetermined duration, the intermediate node can forward the PREQ message to one or more other nodes in the wireless mesh network without setting the first critical flag.

In some embodiments, the path request comprises an Ad hoc On-Demand Distance Vector (AODV) Route Request (RREQ) message, and the path reply comprises an AODV Route Reply (RREP) message. In some embodiments, the wireless mesh network is a Bluetooth mesh network, and the exemplary method and/or procedure is performed by a Bluetooth Low-Energy node.

Figure 9:
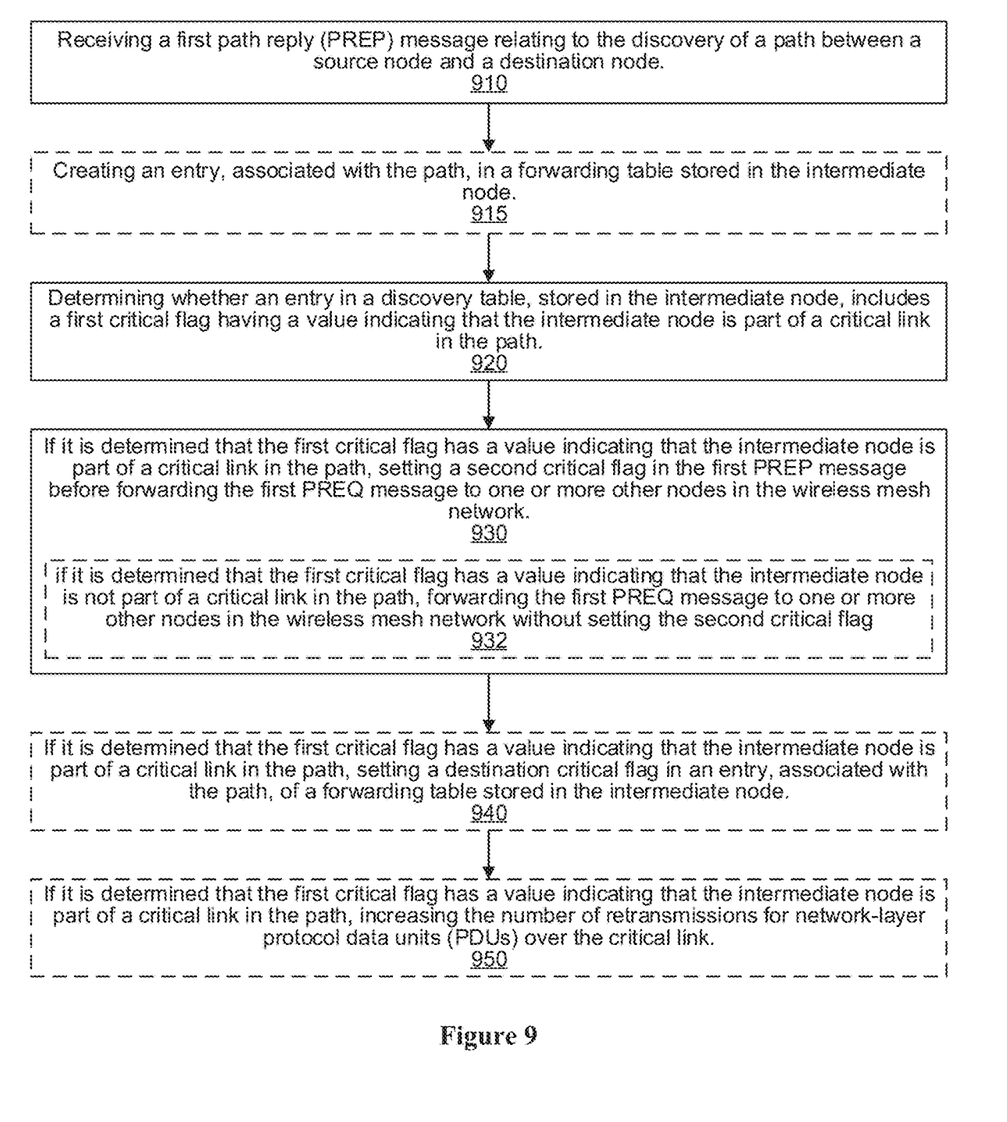
FIG. 9 shows a flow diagram of an exemplary method and/or procedure for forwarding path reply (PREP) messages related to the discovery of a path between a source node and a destination node in a wireless mesh network, according to one or more exemplary embodiments of the present disclosure.

FIG. 9 shows a flow diagram of an exemplary method and/or procedure for forwarding path reply (PREP) messages related to the discovery of a path between a source node and a destination node in a wireless mesh network. The exemplary method and/or procedure can be performed by an intermediate (e.g., relay) node (e.g., user equipment, wireless device, IoT device, Bluetooth Low-Energy device, etc. or component thereof) in the wireless mesh network (e.g., a Bluetooth mesh network). For example, the exemplary method and/or procedure shown in FIG. 9 can be implemented, for example, in a node configured according to FIG. 10 (described below). Furthermore, the exemplary method and/or procedure shown in FIG. 9 can be utilized cooperatively with the exemplary method and/or procedures shown in other figures (including but not limited to FIG. 8) to provide various exemplary benefits described herein. In addition, although FIG. 9 shows blocks in a particular order, this order is merely exemplary, and the operations of the exemplary method and/or procedure can be performed in a different order than shown in FIG. 9 and can be combined and/or divided into blocks having different functionality. Optional blocks or operations are shown by dashed lines.

Exemplary embodiments of the method and/or procedure illustrated in FIG. 9 can include the operations of block 910, in which the intermediate node can receive a first PREP message relating to the discovery of a path between the source node and the destination node. In some embodiments, the exemplary method and/or procedure can also include the operations of block 915, in which the intermediate node can, in response to receiving the first PREP message, create an entry, associated with the path, in a forwarding table stored in the intermediate node.

The exemplary method and/or procedure can also include the operations of block 920, in which the intermediate node can determine whether an entry in a discovery table, stored in the intermediate node, includes a first critical flag having a value indicating that the intermediate node is part of a critical link in the path. The exemplary method and/procedure can also include the operations of block 930, in which the intermediate node can also include the operations of block 930, where if it is determined that the first critical flag has a value indicating that the intermediate node is part of a critical link in the path, the intermediate node can set a second critical flag in the first PREP message before forwarding the first PREQ message to one or more other nodes in the wireless mesh network. In some embodiments, the exemplary method and/procedure can also include the operations of block 932, where if it is determined that the first critical flag has a value indicating that the intermediate node is not part of a critical link in the path, the intermediate node can forward the first PREQ message to one or more other nodes in the wireless mesh network without setting the second critical flag.

In some embodiments, the exemplary method and/procedure can also include the operations of block 940, where if it is determined that the first critical flag has a value indicating that the intermediate node is part of a critical link in the path, the intermediate node can set a destination critical flag in an entry, associated with the path, of a forwarding table stored in the intermediate node. In some embodiments, the exemplary method and/or procedure can also include operations of block 950, where if it is determined that the second critical flag has a value indicating that the intermediate node is part of a critical link in the path, the intermediate node can increase the number of retransmissions for network-layer protocol data units (PDUs) over the critical link.

In some embodiments, each of the path requests comprises an Ad hoc On-Demand Distance Vector (AODV) Route Request (RREQ) message, and the path reply comprises an AODV Route Reply (RREP) message. In some embodiments, the wireless mesh network is a Bluetooth mesh network, and the exemplary method and/or procedure is performed by a Bluetooth Low-Energy node.

Figure 10:
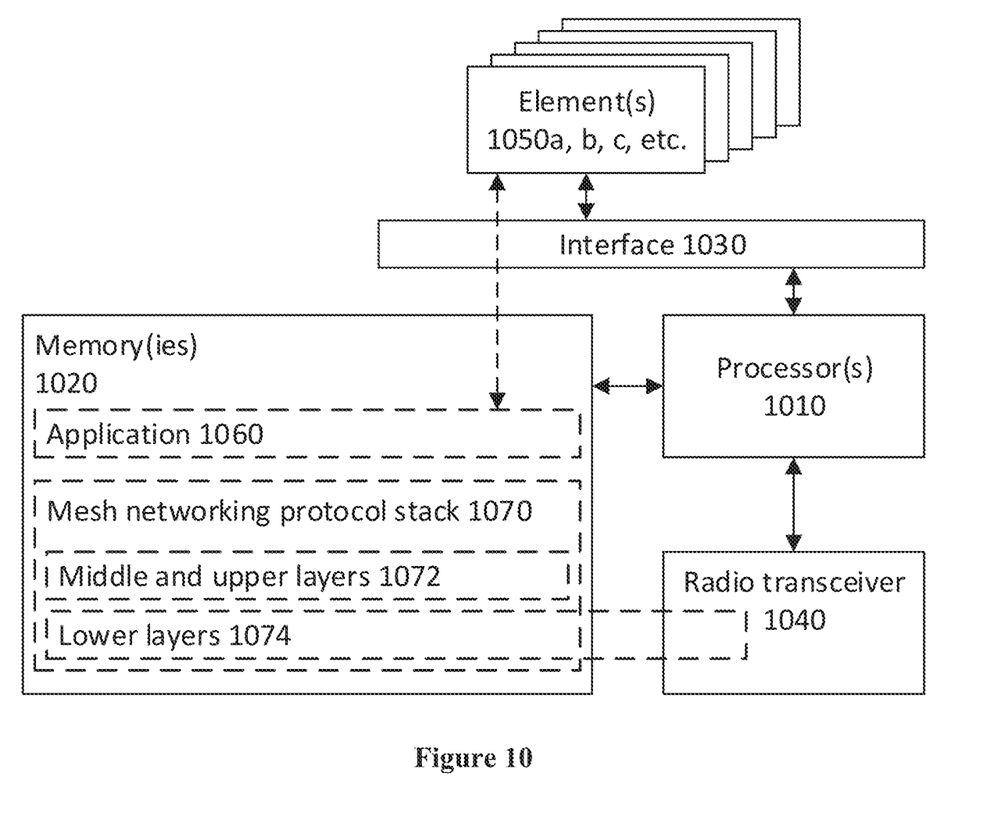
FIG. 10 shows a block diagram of an exemplary wireless mesh device or node according to various embodiments of the present disclosure.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc. FIG. 10 shows a block diagram of an exemplary wireless mesh device or node 1000 according to various embodiments of the present disclosure. For example, exemplary node 1000 can be configured by execution of instructions, stored on a computer-readable medium, to perform operations corresponding to one or more of the exemplary methods and/or procedures described above.

Exemplary node 1000 can comprise one or more processors 1010 that can be operably connected to one or more memories 1020 via address and data buses, serial ports, or other methods and/or structures known to those of ordinary skill in the art. Memory(ies) 1020 comprises software code or programs executed by processor(s) 1010 that facilitates, causes and/or programs exemplary node 1000 to perform various operations.

As shown in FIG. 10, memory(ies) 1020 can include an application 1060 (e.g., application code) and a mesh networking protocol stack 1070, which can further comprise middle and upper layers 1072 and lower layers 1074. For example, protocol stack 1070 can comprise a Bluetooth mesh networking protocol stack, such as shown in FIGS. 1 and 2 and described in more detail above. In such case, the lower layers 1074 can include the Bluetooth LE PHY and link layers, with the remainder of the Bluetooth mesh networking protocol stack comprising middle and upper layers 1072. Furthermore, protocol stack 1070 can include software code that, when executed by processor(s) 1010, configures node 1000 to perform any of the exemplary methods and/or procedures described above, including those shown in FIG. 9-12.

In some embodiments, memory(ies) 1020 and processor(s) 1010 can be subdivided into multiple processors and memories such that a particular memory stores code for lower layers 1074 that is executed by a particular processor, and a further memory stores code for middle and upper layers 1072 that is executed by a further processor. For example, in Bluetooth mesh networking embodiments, the particular memory and particular processor can operate as a Bluetooth device or controller while the further memory and further processor can operate as a Bluetooth host, with a host-controller interface (HCI) between the two.

Exemplary node 1000 also includes a radio transceiver 1040 that is coupled to and communicates with processor 1010. Radio transceiver 1040 includes a transmitter and receiver operable (e.g., in conjunction with processor 1010) to transmit and receive wireless signals at a particular frequency or band of frequencies. In Bluetooth mesh networking embodiments, radio transceiver 1040 can be configured to transmit and receive according to the Bluetooth LE standard in the 2.4-GHz ISM band. In some embodiments, radio transceiver 1040 can comprise portions of lower layers 1074, as illustrated in FIG. 10. For example, in Bluetooth mesh network embodiments, the Bluetooth LE physical layer can be implemented by radio transceiver 1040 in combination with software code executed by processor 1010. Furthermore, although not shown, radio transceiver 1040 can include one or more antennas that facilitate transmission and reception in the appropriate frequency band.

In some embodiments, node 1000 can also include one or more element(s) 1050a, 1050b, 1050c, etc. that can provide an interface with the physical environment in which node 1000 is located. For example, element(s) 1050 can monitor and/or collect data related to operation of a physical process or machine. As another example, element(s) 1050 can control one or more aspects of such a physical process. As such, it can be desirable to transmit the collected data to and/or receive control commands from a remote source via the mesh networking functionality of node 1000.

This can be done, for example, by application 1060 which can communicate with both mesh networking stack 1070 and the element(s) 1050. This logical communication between application 1060 and element(s) 1050 is illustrated in FIG. 10 as a dashed line. In some embodiments, however, the physical communication (illustrated by solid lines) between application 1060 and element(s) 1050 can be performed via an interface circuit 1030 interposed between element(s) 1050 and processor(s) 1010.

As described herein, device, node, and/or apparatus can be represented by a semiconductor chip, a chipset, or a (hardware) module comprising such chip or chipset; this, however, does not exclude the possibility that a functionality of a device, node, or apparatus, instead of being hardware implemented, be implemented as a software module such as a computer program or a computer program product comprising executable software code portions for execution or being run on a processor. Furthermore, functionality of a device, node, or apparatus can be implemented by any combination of hardware and software. A device, node, or apparatus can also be regarded as an assembly of multiple devices and/or apparatuses, whether functionally in cooperation with or independently of each other. Moreover, devices, nodes, and apparatuses can be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated clauses:

Clause 1. A method, performed by an intermediate node in a wireless mesh network, for forwarding path request (PREQ) messages relating to discovery of a path between a source node and a destination node, the method comprising:
  receiving a first PREQ message relating to the discovery of a path between the source node and the destination node;
  determining whether further PREQ messages relating to the discovery of the path were received during a predetermined duration after receiving the first PREQ message;
  if it is determined that further PREQ messages relating to the discovery of the path were not received during the predetermined duration, setting a first critical flag in a discovery table entry associated with the path between the source node and the destination node; and
  forwarding the PREQ message to one or more other nodes in the wireless mesh network.

Clause 2. The method of clause 1, wherein the first critical flag in the discovery table indicates that the intermediate node can be part of a critical link in the path.

Clause 3. The method of any of clauses 1-2, wherein setting the first critical flag in the discovery table is further based on one of the following:
  determining that a forwarding table, stored in the intermediate node, includes an entry corresponding to a path between the source node and the destination node, and that the entry includes a second critical flag having a value indicating that the intermediate node is part of a critical link in the path; or
  determining that the forwarding table does not include an entry corresponding to a path between the source node and the destination node.

Clause 4. The method of clause 3, further comprising, prior to forwarding the PREQ message, setting the value of a flag comprising the PREQ message to indicate that the forwarding table does not include an entry corresponding to a path between the source node and the destination node.

Clause 5. The method of any of clauses 1-4, wherein if it is determined that further PREQ messages relating to the discovery of the path were received during the predetermined duration, forwarding the PREQ message to one or more other nodes in the wireless mesh network without setting the first critical flag.

Clause 6. The method of any of clauses 1-5, further comprising discarding the first PREQ message based on determining that:
  the forwarding table includes an entry corresponding to a path between the source node and the destination node; and
  the entry includes the second critical flag having a value indicating that the intermediate node is not part of a critical link in the path.

Clause 7. The method of any of clauses 1-6, wherein:
  the path request comprises an Ad hoc On-Demand Distance Vector (AODV) Route Request (RREQ) message; and
  the path reply comprises an AODV Route Reply (RREP) message.

Clause 8. The method of any of clauses 1-7, wherein the wireless mesh network is a Bluetooth mesh network, and the method is performed by a Bluetooth Low-Energy node.

Clause 9. A method, performed by an intermediate node in a wireless mesh network, for forwarding path reply (PREP) messages relating to discovery of a path between a source node and a destination node, the method comprising:
  receiving a first PREP message relating to the discovery of a path between the source node and the destination node;
  determining whether an entry in a discovery table, stored in the intermediate node, includes a first critical flag having a value indicating that the intermediate node is part of a critical link in the path;
  if it is determined that the first critical flag has a value indicating that the intermediate node is part of a critical link in the path, setting a second critical flag in the first PREP message before forwarding the first PREQ message to one or more other nodes in the wireless mesh network.

Clause 10. The method of clause 9, further comprising: if it is determined that the first critical flag has a value indicating that the intermediate node is part of a critical link in the path, setting a destination critical flag in an entry, associated with the path, of a forwarding table stored in the intermediate node.

Clause 11. The method of any of clauses 9-10, further comprising: if it is determined that the first critical flag has a value indicating that the intermediate node is not part of a critical link in the path, forwarding the first PREQ message to one or more other nodes in the wireless mesh network without setting the second critical flag.

Clause 12. The method of any of clauses 9-11, further comprising: in response to receiving the first PREP message, creating an entry, associated with the path, in a forwarding table stored in the intermediate node.

Clause 13. The method of any of clauses 9-12, further comprising:
  determining whether the second critical flag, comprising the received first PREP message, has a value indicating that the intermediate node is part of a critical link in the path; and
  if it is determined that the second critical flag has a value indicating that the intermediate node is part of a critical link in the path, setting a source critical flag in an entry, associated with the path, of a forwarding table stored in the intermediate node.

Clause 14. The method of clause 13, further comprising: if it is determined that the second critical flag has a value indicating that the intermediate node is part of a critical link in the path, increasing the number of retransmissions for network-layer protocol data units (PDUs) over the critical link.

Clause 15. The method of any of clauses 9-14, wherein:
  each of the received path requests comprises an Ad hoc On-Demand Distance Vector (ADOV) Route Request (RREQ) message; and
  the path reply comprises an AODV Route Reply (RREP) message.

Clause 16. The method of any of clauses 9-15, wherein the wireless mesh network is a Bluetooth mesh network, and the method is performed by a Bluetooth Low-Energy node.

Clause 17. A node in a wireless mesh network that includes one or more source nodes, one or more destination nodes, and a plurality of intermediate nodes, wherein the node comprises:
  a wireless transceiver; and
  processing circuitry operatively coupled to the wireless transceiver, the combination being configured to perform operations corresponding to the methods of any of clauses 1-16.

Clause 18. A non-transitory, computer-readable medium storing computer-executable instructions that, when executed by processing circuitry comprising a node in a wireless mesh network, configure the node to perform operations corresponding to the methods of any of clauses 1-16.

Clause 19. A wireless mesh network comprising:
  one or more source nodes, each source node comprising a wireless transceiver and processing circuitry operably coupled and configured to perform path discovery operations;
  one or more destination nodes, each destination node comprising a wireless transceiver and processing circuitry operably coupled and configured to perform path discovery operations; and
  a plurality of intermediate nodes interconnected in a mesh topology and configured to forward messages between the source nodes and the destination nodes and to perform operations corresponding to any of the methods of clauses 1-16.

Clause 20. A wireless mesh network comprising a plurality of nodes, each node comprising a wireless transceiver and processing circuitry operably coupled and configured to perform at least one of the following:
  path discovery operations associated with source nodes;
  path discovery operations associated with destination nodes; and
  intermediate-node operations corresponding to any of the methods of clauses 1-16.

Notably, modifications and other embodiments of the disclosed embodiments will come to mind to one skilled in the art having the benefit of the teachings presented in the foregoing descriptions and the associated drawings. Therefore, it is to be understood that the scope of the disclosure is not to be limited to the specific embodiments disclosed and that modifications and other variants are intended to be included within the scope. Although specific terms can be employed herein, they are used in a generic and descriptive sense only and not for purposes of limitation.

The invention claimed is:

1. A method for identifying a critical link in a path between a source node and a destination node in a wireless mesh network, wherein said method comprises:
  receiving, by an intermediate node in said wireless mesh network, a forwarding path request (PREQ) message relating to a discovery of a path between said source node and said destination node;
  determining, by said intermediate node, that further PREQ message relating to the discovery of said path are not received during a predetermined duration;
  in response to said determining, setting a first critical flag in a discovery table entry associated with said path between said source node and said destination node; and
  forwarding, by said intermediate node, said received PREQ message to one or more other nodes in said wireless mesh network.

2. The method in accordance with claim 1, wherein said first critical flag in said discovery table indicates that said intermediate node is part of said critical link in said path between said source node and said destination node.

3. The method in accordance with claim 1, wherein setting said first critical flag in said discovery table entry is further based on:
  determining, by said intermediate node, that a forwarding table, stored in said intermediate node, includes an entry corresponding to said path between said source node and said destination node, and that the entry includes a second critical flag having a value indicating that the intermediate node is part of said critical link in said path.

4. The method in accordance with claim 1, wherein setting said first critical flag in said discovery table entry is further based on:
  determining, by said intermediate node, that a forwarding table, stored in said intermediate node does not include an entry corresponding to said path between said source node and said destination node.

5. The method in accordance with claim 4, further comprising, prior to forwarding the PREQ message, setting the value of a flag included in the PREQ message to indicate that the forwarding table does not include an entry corresponding to said path between the source node and the destination node.

6. The method in accordance with claim 1, further comprising discarding the first PREQ message based on determining that:
  a forwarding table, stored in said intermediate node, includes an entry corresponding to said path between the source node and the destination node; and
  the entry includes the second critical flag having a value indicating that the intermediate node is not part of a critical link in said path.

7. The method in accordance with claim 1, wherein:
  PREQ message request comprises an Ad hoc On-Demand Distance Vector (AODV) Route Request (RREQ) message.

8. The method in accordance with claim 1, wherein the wireless mesh network is a Bluetooth mesh network, and the method is performed by a Bluetooth Low-Energy node.

9. A node in a wireless mesh network that includes one or more source nodes, one or more destination nodes, and a plurality of intermediate nodes, wherein the node comprises:
a wireless transceiver; and
processing circuitry operatively coupled to the wireless transceiver, the combination being configured to perform operations corresponding to the method of claim 1.

10. A non-transitory, computer-readable medium storing computer-executable instructions that, when executed by processing circuitry comprising a node in a wireless mesh network, configure the node to perform operations corresponding to the method of claim 1.

11. A wireless mesh network comprising:
one or more source nodes, each source node comprising a wireless transceiver and processing circuitry operably coupled and configured to perform path discovery operations;
one or more destination nodes, each destination node comprising a wireless transceiver and processing circuitry operably coupled and configured to perform path discovery operations; and
a plurality of intermediate nodes interconnected in a mesh topology and configured to forward messages between the source nodes and the destination nodes, at least one of the intermediate nodes being configured to perform operations corresponding to the method of claim 1.

12. A method, performed by an intermediate node in a wireless mesh network, for identifying a critical link in a path between a source node and a destination node in a wireless mesh network, wherein said method comprises:
receiving, by said intermediate node, a first forwarding path reply (PREP) message relating to the discovery of a path between the source node and the destination node;
determining, by said intermediate node, that an entry in a discovery table, stored in the intermediate node, includes a first critical flag having a value indicating that the intermediate node is part of a critical link in said path;
setting, by said intermediate node in response to said determining, a second critical flag in said first PREP message; and
forwarding, by said intermediate node, said first PREP message to one or more other nodes in the wireless mesh network.

13. The method in accordance with claim 12, further comprising:
setting, by said intermediate node in response to said determining, a destination critical flag in an entry, associated with said path, of a forwarding table stored in said intermediate node.

14. The method in accordance with claim 12, further comprising:
in response to receiving said first PREP message, creating, by said intermediate node, an entry, associated with said path, in a forwarding table stored in said intermediate node.

15. The method in accordance with claim 12, further comprising:
determining, by said intermediate node, that the second critical flag, included in the received first PREP message, has a value indicating that the intermediate node is part of a critical link in said path; and
in response to determining that the second critical flag has such a value, setting, by said intermediate node, a source critical flag in an entry, associated with said path, of a forwarding table stored in said intermediate node.

16. The method in accordance with claim 15, wherein said method further comprises the step of:
increasing, by said intermediate node, the number of retransmissions for network-layer protocol data units (PDUs) over said critical link.

17. The method in accordance with claim 12, wherein:
said first PREP message comprises an AODV Route Reply (RREP) message.

18. A method in accordance with claim 12, wherein the wireless mesh network is a Bluetooth mesh network, and wherein the method is performed by a Bluetooth Low-Energy node.

19. A node in a wireless mesh network that includes one or more source nodes, one or more destination nodes, and a plurality of intermediate nodes, wherein the node comprises:
a wireless transceiver; and
processing circuitry operatively coupled to the wireless transceiver, the combination being configured to perform operations corresponding to the method of claim 12.

20. A non-transitory, computer-readable medium storing computer-executable instructions that, when executed by processing circuitry comprising a node in a wireless mesh network, configure the node to perform operations corresponding to the method of claim 12.

21. The wireless mesh network of claim 11, wherein at least one of the intermediate nodes is configured to perform operations corresponding to the method of claim 12.

* * * * *

UNITED STATES PATENT AND TRADEMARK OFFICE
CERTIFICATE OF CORRECTION

PATENT NO. : 10,716,048 B2  
APPLICATION NO. : 16/309569  
DATED : July 14, 2020  
INVENTOR(S) : Arvidson et al.

It is certified that error appears in the above-identified patent and that said Letters Patent is hereby corrected as shown below:

In the Specification

In Column 6, Line 55, delete "destinations nodes," and insert -- destination nodes, --, therefor.

In Column 7, Line 12, delete "though" and insert -- through --, therefor.

In Column 7, Line 42, delete "illustrate" and insert -- illustrates --, therefor.

In Column 10, Line 39, delete "message" and insert -- message. --, therefor.

In Column 14, Line 8, delete "FIG. 9-12." and insert -- FIGS. 9-12. --, therefor.

In Column 17, Line 20, delete "(ADOV)" and insert -- (AODV) --, therefor.

In the Claims

In Column 18, Line 46, in Claim 4, delete "node" and insert -- node, --, therefor.

In Column 18, Line 65, in Claim 7, delete "PREQ message request" and insert -- the PREQ message --, therefor.

In Column 20, Line 30, in Claim 18, delete "A" and insert -- The --, therefor.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*